Patented May 2, 1950

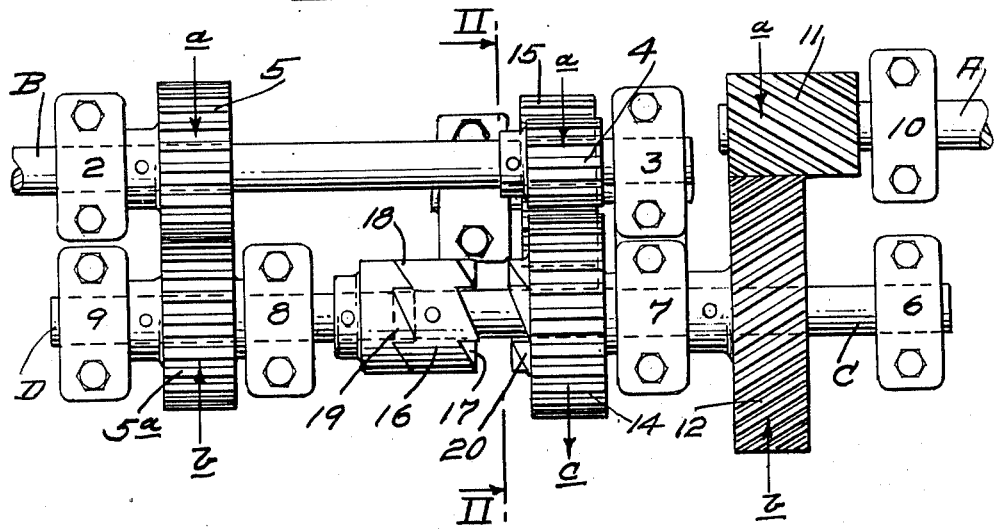
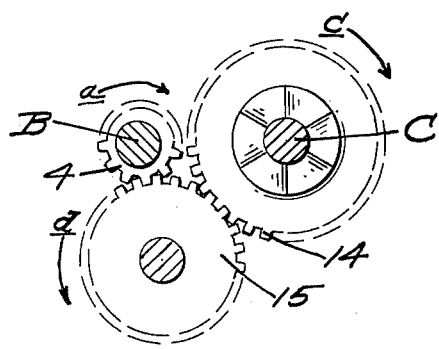
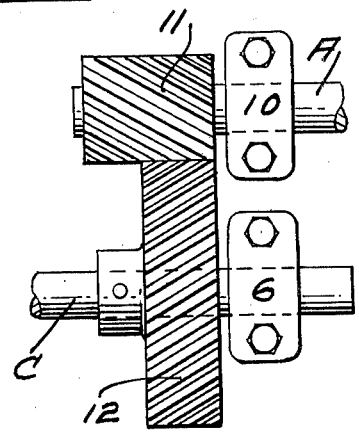

2,505,841

UNITED STATES PATENT OFFICE 2,505,841

ONE-WAY DRIVE

William Shuker, San Francisco, and
Harry Murray, Ross, Calif.

Application November 5, 1945, Serial No. 626,590

2 Claims. (Cl. 74—812)

This invention relates to a driving mechanism in general, and in particular to a drive in which the rotation of a drive shaft in opposite directions imparts to a driven shaft rotation in one direction only.

The object of the present invention is generally to improve and simplify the construction and operation of drives of the character described; to provide a drive which comprises a drive and a driven shaft, a first and a second intermediate shaft; a gear drive between the drive and the first intermediate shaft; a gear drive between the driven and second intermediate shaft; a reversing gear drive between the driven and the first intermediate shaft and a clutch mechanism for connecting one or another of the gear drives whereby the driven shaft is driven; and further, to provide means whereby reversal of the drive shaft will automatically actuate the clutch so that the driven shaft will be driven in one direction only.

The driving mechanism is shown by way of illustration in the accompanying drawings in which:

Fig. 1 is a plan view of the driving mechanism;

Fig. 2 is a cross section taken on line II—II of Fig. 1; and

Fig. 3 is a plan view of the spiral gear drive formed between the drive and the first intermediate shaft, said view showing the driven spiral gear shifted with relation to the position shown in Fig. 1.

Referring to the drawings in detail, and particularly to Figs. 1 and 2, A indicates a reversible drive shaft, and B a driven shaft to be driven in one direction only. The driven shaft is mounted in bearings 2 and 3 and secured thereon are two spur gears such as indicated at 4 and 5. A pair of intermediate shafts indicated at C and D are also employed, the shaft C being supported in bearings 6 and 7 and the shaft D in bearings 8 and 9. One or more bearings such as indicated at 10 are provided for the support of the drive shaft.

Secured on the drive shaft is a spiral gear driving pinion 11 and intermeshing therewith and secured on the first intermediate shaft C is the spiral driven gear 12. Freely rotatable on the first intermediate shaft C is a spur gear 14 which intermeshes with an intermediate gear 15 and this in turn intermeshes with the gear 4. The gear train formed by the gears 14, 15 and 4 will hereinafter be referred to as a reversing gear train. Secured on the first intermediate shaft C is a clutch member 16 on the opposite faces of which are formed teeth 17 and 18. Secured on the second intermediate shaft D is a cooperating jaw clutch 19 and formed on one face of the gear 14 is a cooperating jaw clutch 20. The first intermediate shaft C, together with the clutch 16 and the gear 12, is longitudinally movable in the bearings 6 and 7, and such longitudinal movement is utilized to shift the clutch 16 either into engagement with the clutch 19 or the clutch 20. The longitudinal movement of this shaft and the clutch and the gear carried thereby is automatic and is based on the fact that if a pair of intermeshing spiral gears are employed such as indicated at 11 and 12, an end thrust is produced due to the angular disposition of the gear teeth. Thus, when the driving pinion 11 is rotated in the direction of arrow $a$, the thrust between the angularly disposed teeth of said pinion and of the gear 12 causes gear 12 together with the shaft C and the clutch 16 to assume the position shown in Fig. 1, thus if the drive shaft and pinion 11 are rotating in the direction of arrow $a$, gear 12 together with the shaft C and clutch 16 will rotate in the direction of arrow $b$, and as the clutches 16 and 18 are engaged, power will be transmitted to the shaft D and a gear 5a secured thereon in the direction of arrow $b$, and as the gear 5a meshes with the gear 5 secured on the driven shaft B, the driven shaft will rotate in the direction of arrow $a$. Conversely, if the direction of the drive shaft A and the pinion 11 is reversed, the thrust between the angularly disposed teeth of the gears 11 and 12 will be in the opposite direction, and gear 12, together with shaft C and clutch 16, will move to the opposite end of the pinion 11, or in other words assume the position shown in Fig. 3. When that shift is made, clutch 16 will engage the clutch 20 and as the direction or rotation of shaft C has been reversed, gear 14 will be driven in the direction of arrow $c$, and as this intermeshes with the intermediate gear 15, that gear will be driven in the direction of arrow $d$ and as it in turn meshes with the gear 4, that gear will be rotated in the direction of arrow $a$, and as gear 4 is secured on the driven shaft, it is obvious that the driven shaft B will rotate in the direction of arrow $a$, regardless of whether the drive shaft A rotates in one direction or another.

Broadly speaking, by employing the spiral gear drive shown at 11 and 12, a driving connection is formed which when reversed, shifts the clutch 16 either into mesh with the reverse gear train or into mesh with the clutch 19 which drives the second intermediate shaft. The shift of the clutch 16 is thus automatic, and it is so positioned that it will either drive through the reverse gear train or through the gears 5 and 5a, thus insuring rotation of the driven shaft in one direction only.

A drive of this character may have many applications and uses, for instance in a marine type of Diesel motor which is reversible so that it may be driven either ahead or astern, it is important that the water circulating pump and the fuel pump be driven in one direction regardless of whether the engine is going ahead or reverse. Thus, by introducing the drive here shown between either the water circulating or the fuel pump and a drive shaft, proper operation of both or either pump is insured, and while this and other features of the invention have been more or less specifically described and illustrated, it should be understood that changes may be resorted to within the scope of the appended claims and that the materials and finish of the several parts employed may be such as the experience or judgment of the manufacturer may dictate or varying conditions or uses may demand.

Having thus described our invention, what we claim and desire to secure by Letters Patent is:

1. A driving mechanism comprising a driven shaft, first and second gears fast on said shaft, a reverse gear in mesh with said first gear, a first driving gear in mesh with said reverse gear, a second driving gear in mesh with said second gear, a first intermediate shaft axially slidable and journalled in said first driving gear, a main jaw clutch member fast on and slidable with said first intermediate shaft, a first cooperating jaw clutch member on said first driving gear, a second intermediate shaft supporting and fast on said second driving gear, a second cooperating jaw clutch member fast on said second intermediate shaft, a driven spiral gear fast on and slidable with said first intermediate shaft, a driving shaft held against axial movement, and a driving spiral gear fast on said driving shaft and meshing with said driven spiral gear.

2. A driving mechanism comprising a driven shaft, first and second spur gears fast on said shaft, a reverse spur gear in mesh with said first spur gear, a first driving spur gear in mesh with said reverse gear, a second driving spur gear in mesh with said second spur gear, a first intermediate shaft parallel to said driven shaft and axially slidable and journalled in said first driving spur gear, a main jaw clutch member fast on and slidable with said first intermediate shaft, a first cooperating jaw clutch member on said first driving gear, a second intermediate shaft in axial alinement with said first intermediate shaft and supporting and fast on said second driving spur gear, a second cooperating jaw clutch member fast on said second intermediate shaft, a driven spiral gear fast on and slidable with said first intermediate shaft, a driving shaft parallel to said driven shaft and held against axial movement, and a driving spiral gear fast on said driving shaft and meshing said driven spiral gear.

WILLIAM SHUKER.
HARRY MURRAY.

REFERENCES CITED

The following references are of record in the file of this patent:

UNITED STATES PATENTS

| Number | Name | Date |
|---|---|---|
| 1,441,528 | Reid et al. | Jan. 9, 1923 |
| 1,497,119 | Reid et al. | June 10, 1924 |

FOREIGN PATENTS

| Number | Country | Date |
|---|---|---|
| 484,021 | Great Britain | Apr. 29, 1938 |